Nov. 7, 1933.     L. BRADLEY ET AL     1,934,655
TREATMENT OF RESIDUAL LIQUORS
Filed April 2, 1928
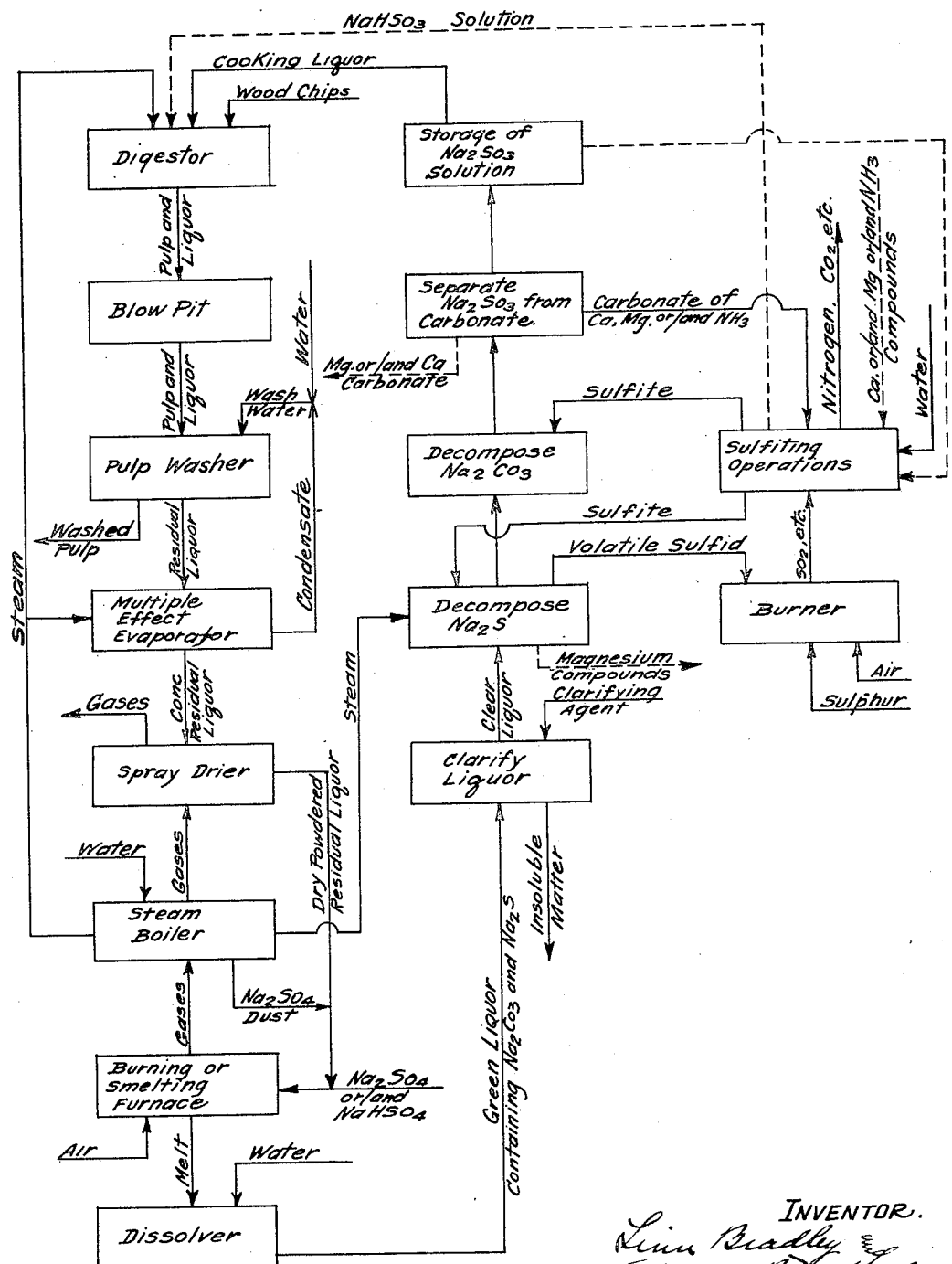
INVENTOR.
Linn Bradley
Edward P. McKeefe
By Pennie Davis Marvin Edmunds Patented Nov. 7, 1933

1,934,655

UNITED STATES PATENT OFFICE 1,934,655

TREATMENT OF RESIDUAL LIQUORS

Linn Bradley, Montclair, N. J., and Edward P. McKeefe, Plattsburgh, N. Y., assignors to Bradley-McKeefe Corporation, New York, N. Y., a corporation of New York Application April 2, 1928. Serial No. 266,863

19 Claims. (Cl. 23—129)

This invention relates to improvements in the treatment of residual liquor resulting from the cooking of wood, etc. in a cooking liquor containing sodium sulfite or other sulfur bearing compounds of sodium and to the production of sulfites such as sodium sulfite adapted for use in such cooking liquor.

The invention includes an improved process of treating solutions containing sodium sulfid, and particularly solutions containing sodium carbonate and sodium sulfid, to effect simultaneous sulfiting of such solutions and elimination of the sulfid sulfur therefrom, thereby producing directly, as a result of the combined sulfiting and sulfid removal, a solution containing sodium sulfite. This combined sulfiting and sulfid removal is accomplished by treating the solution containing sodium sulfid with a suitable sulfite, e. g., ammonium sulfite, which will react with the sodium sulfid to form sodium sulfite and a volatile sulfid (i. e., hydrogen sulfid or ammonium sulfid) which is driven off from the solution together with ammonia. Other sulfites such as magnesium sulfite or calcium sulfite can be used under suitable temperature conditions, or mixtures thereof with ammonium sulfite.

When a furnace product containing sodium carbonate and sodium sulfid is dissolved in water and the cool solution sulfited with gaseous $SO_2$ a considerable amount of thiosulfate is usually formed, and large amounts of thiosulfate are objectionable in regenerated sulfite cooking liquors, and even small amounts of thiosulfate are objectionable in acid sodium sulfite cooking liquors. In order to avoid the formation of such objectionable amounts of thiosulfate by directly sulfiting such solutions it has been proposed to first remove the sulfid sulfur of the solution and then subsequently to sulfite the sulfid free solution.

The present invention enables such solutions containing sodium sulfid to be directly sulfited and the sulfid sulfur simultaneously removed without the formation of objectionable amounts of thiosulfate.

The present invention is based upon the discovery that such a solution (i. e. containing sodium sulfid, e. g. sodium carbonate and a substantial but lesser amount of sodium sulfid) can be treated so as to form a volatile sulfid from sulfur content of the sodium sulfid and so as to remove such volatile sulfid from the solution and so as to convert a portion of the sodium content of the sodium sulfid into sodium sulfite, providing the solution is maintained substantially non-acid in character while introducing the sulfite radicle, thereby providing a solution which contains more sodium present as a sulfite of sodium than as a thiosulfate of sodium. The amount of thiosulfate-sulfur in such resulting solution in proportion to the amount of sulfite-sulfur therein can be thereby suitably regulated.

The volatile sulfid removed from the solution may be oxidized to form a sulfite and such sulfite may be regained in any suitable manner and may be employed in forming a sulfite of sodium, or such sulfid may be otherwise utilized or treated.

According to one embodiment of the invention, we prepare such a solution containing sodium carbonate and sodium sulfid by treating such a furnace product with a suitable amount of water so as to produce a relatively concentrated solution. By employing hot water, or otherwise obtaining a hot solution, the concentrated solution may be obtained at a temperature of between, for example, 60 to 100 degrees centigrade.

Ammonium sulfite in concentrated and cool solution, and with some free ammonia therein if desired, is added to the hot concentrated solution containing sodium carbonate and sodium sulfid in small and regulated amounts until at least, or preferably more than, as much has been added as is chemically equivalent to the sodium sulfid, such as shown by the equation:

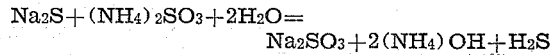
$$Na_2S + (NH_4)_2SO_3 + 2H_2O = Na_2SO_3 + 2(NH_4)OH + H_2S$$

and the solution is boiled and agitated, e. g., by introducing steam, during the addition of the ammonium sulfite, and such boiling and agitation is continued until all or nearly all volatile sulfid thus formed has been removed from the solution. More ammonium sulfite than is chemically equivalent to the sodium sulfid, for example around 50% more or a larger amount up to an amount which is chemically equivalent to both the sodium carbonate and the sodium sulfid, may be thus added if desired. When such a large amount of ammonium sulfite is added, some carbon dioxide may be driven off along with ammonia and a volatile sulfid, and some or substantially all of the sodium carbonate be thus converted into sodium sulfite. When ammonium sulfite is added to such a solution in an amount which is just chemically equivalent to the amount of sodium sulfid, or a lesser amount is added, it is difficult if not impossible to remove from the solution substantially all of the sulfid-sulfur of the sodium sulfid as a volatile sulfid. By adding a considerably larger amount of ammonium sulfite, such as pointed out above, it is possible to remove a preponderating portion of such sulfid-sulfur from the solution and to convert a preponderating amount of the sodium content of the sodium sulfid into a sulfite of sodium. By operating in the above manner, and especially when the ammonium sulfite solution so added carries a considerable amount of free ammonia or the free ammonia is otherwise supplied to the solution which contains the sodium sulfid, the solution is maintained substantially non-acid in character until the desired amount of sulfid-sulfur has been removed from the solution as a volatile sulfid.

After such treatment by means of ammonium sulfite and after sulfid-sulfur has been removed as a volatile sulfid and substantially all ammonia has been removed from the solution, the resulting solution may be given such further treatment as necessary or desired in order to form a regenerated cooking liquor. For example, the resulting solution may be used to absorb sulfur dioxide from gases obtained by burning sulfur or/and a suitable sulfid, and the resulting solution may be suitably cooled if needed or desired prior to further sulfiting. In case the regenerated cooking liquor is to be alkaline to litmus and contain mostly sodium sulfite ($Na_2SO_3$), sodium carbonate (if any) remaining in the solution after removal of sulfid-sulfur and ammmonia may be sulfited even while the solution is warm or hot until the desired amount of sodium sulfite has been formed from such remaining sodium carbonate. If the regenerated cooking liquor is to be strongly acid to litmus, the solution should be suitably cooled before completing the sulfiting treatment.

In carrying out the process in accordance with the embodiment described above, the hot solution which is to be treated with the ammonium sulfite may be placed in an iron tank provided with a suitable agitator and with a steam nozzle equipped with a valve so that the amount of steam employed for driving off volatile sulfid and ammonia may be suitably controlled. Suitable means for creating a vacuum may be connected to the tank to assist in removing volatile products. The vessel or tank may be suitably enclosed but provided with means for collecting volatile sulfid and ammonia driven off from the solution and for conducting such volatilized materials, especially sulfid-sulfur, to a combustion chamber, such for example as that customarily operated in conjunction with a sulfur burner. Such volatilized sulfid-sulfur may be therein subjected to a regulated oxidation by means of heated air so as to convert sulfid-sulfur into sulfite-sulfur. The resulting gases are withdrawn from the combustion chamber and suitably cooled and ammonia and resulting sulfite are absorbed in cool water to form a cool and suitably concentrated solution of ammonium sulfite. Such solution may with advantage contain some ammonium carbonate or/and free ammonia. This solution may have such additional supplies of carbon dioxide, ammonia and/or sulfur dioxide added thereto as may be necessary in order to provide the nedded or desired amount of ammonium sulfite, and ammonia or/and ammonium carbonate if any, for treating another batch or lot of solution containing sodium carbonate and sodium sulfid such as described above.

If desired, the amount of ammonium sulfite thus added to a soda solution such as referred to above, which is to be sulfited thereby, may be as large as is sufficient to convert sodium sulfid into sodium sulfite and drive off volatile sulfid and to convert a desired portion (e. g. a preponderating portion) or even substantially all of the sodium carbonate into a sulfite of sodium, so that upon completion of the step of removing volatile sulfid and ammonia, the resulting solution may contain little if any carbonate of sodium and it may require relatively little if any additional sulfiting, except such as may be needed in order to produce an acid cooking liquor when such is desired. Thus the amount of ammonium sulfite added to the sodium carbonate-sodium sulfid solution may vary considerably. It is usually preferable to add somewhat more ammonium sulfite than is just chemically equivalent to the sodium sulfid, when ammonium sulfite is mainly or fully relied upon for the sulfiting treatment, since by so doing sulfid-sulfur can be removed from the solution to a greater extent than when a relatively small amount of sulfite, such as ammonium sulfite for example, is employed.

As a specific example of the operation of the process in which the solution containing sodium carbonate and sodium sulfid is treated with ammonium sulfite, the following description is given. The furnace product, e. g., containing sodium carbonate and sodium sulfid, is treated with water in such amount and at such temperature as to give a hot solution, for example around 80 to 100 deg. C., so that 1,500 gallons of liquor contain around 2,245 pounds of sodium carbonate ($Na_2CO_3$) and around 824 pounds of sodium sulfid ($Na_2S$). This hot solution is placed in a suitable iron tank provided with an agitator and a steam nozzle and with means for collecting and removing volatile sulfid and ammonia to a combustion chamber such as described. A cool concentrated solution of ammonium sulfite, which contains about 1,838 to 2,450 pounds, more or less, of ammonium sulfite, $(NH_4)_2SO_3$, and also contains about 150 to 300 pounds, more or less, of free ammonia, $(NH_4)OH$, is added slowly and at a gradual rate and in a somewhat continuous manner, to the solution containing the sodium carbonate and the sodium sulfid, while the solution in the tank is being vigorously agitated and steam is being introduced to maintain the solution at the boiling point. Volatile sulfid and ammonia are thus driven out from the solution and these are conducted to a suitable combustion chamber into which a regulated amount of air is suitably introduced. The resulting sulfur dioxide and ammonia, or ammonium sulfite, are suitably cooled and then absorbed in cool water to form another lot or batch of cool and concentrated ammonium sulfite solution. A sufficient amount of ammonia and/or sulfur dioxide are added to this solution in any suitable manner, as may be needed, thus replacing losses of ammonia and sulfur dioxide. Such reproduced ammonium sulfite solution, together with free ammonia if needed or desired, is employed for treating another batch of sodium carbonate and sodium sulfid in the foregoing manner; and the process may be repeated over and over again.

The sodium-bearing solution, remaining after removal of volatile sulfid and ammonia therefrom, may still contain some carbonate of sodium (such as in the above specific example). This liquor may be thereafter subjected to a further sulfiting treatment, such as for example, by absorbing sulfur dioxide gas in such liquor until any desired portion or even all remaining carbonate of sodium has been acted upon by the sulfite radicle, thereby forming more sulfite of sodium. When the liquor has been sulfited so that substantially all of the carbonate of sodium has been acted upon by the sulfite radicle, the sulfiting may be discontinued, thereby providing a liquor which contains mostly sodium sulfite, the sodium content of which has been derived in part from the sodium sulfid and in part from the sodium carbonate. Such liquor may be modified if needed or desired, such as by evaporation or by dilution with water, to provide regenerated cooking liquor of the desired composition and strength, for example so that the cooking liquor is about 3,000 to 3,500 gallons and contains around 4,000 pounds of $Na_2SO_3$ and a lesser amount of sodium thiosulfate if any. Such cooking liquor may be employed for a digestion of around 9,000 pounds (air-dry basis) of poplar wood to produce chemical pulp in a manner disclosed in our former U. S. application Serial No. 481,147, filed July 28, 1921. The residual liquor resulting from such digesting operation may be the liquor which is evaporated and thus provide the residue which is to be furnaced under reducing conditions to form the furnace product referred to above. And the complete cycle may be carried out a plurality of times without the thiosulfate of sodium building up in the regenerated cooking liquor to a commercially prohibitive amount and without rendering a commercially prohibitive amount of the sodium inactive or unavailable for the desired reaction or reactions in the digesting step of the cyclic process.

Instead of discontinuing the sulfiting of the treated liquor, e. g. just at the point when all of the carbonate of sodium has been acted upon by the sulfite radicle, the sulfiting may be continued until an acid cooking liquor of desired ratio of free to combined sulfur dioxide composition is obtained, and the liquor may be diluted and cooled at any suitable time and in any suitable manner, and such cooking liquor may vary considerably in composition. Thus the cooking liquor may contain both normal sodium sulfite and sodium bisulfite, or it may contain sodium bisulfite and sulfurous acid, or it may contain sodium bisulfite without either sulfurous acid or normal sodium sulfite. When such regenerated cooking liquor contains sulfurous acid as well as sodium bisulfite, special care should be taken in its preparation to avoid the presence therein of more than a very small amount of thiosulfate. Thiosulfate is preferably absent from such an acid cooking liquor.

By maintaining the soda solution alkaline with a sufficient amount of free ammonia until substantially all sulfid-sulfur has been removed therefrom as a volatile sulfid, formation of thiosulfate in the liquor can be minimized, provided the sodium carbonate-sodium sulfid solution contains no loosely combined sulfur at the time the sulfite radicle is first introduced, especially if the soda liquor is maintained at or around the boiling point throughout the period in which the sulfite radicle is introduced and the sulfite radicle is introduced in the manner outlined above.

Such acid cooking liquors may be employed for digesting wood, etc., to produce chemical pulp or other suitable fibrous material, and the resulting residual liquor may be the liquor which is evaporated to yield the residue which is to be subsequently furnaced under reducing conditions to form the furnace product referred to above.

Instead of obtaining a furnace product such as described above, from residual liquor of a sulfite of sodium type of digesting treatment, the sodium sulfid or sodium carbonate-sodium sulfid mixture may be obtained in any other suitable manner and from any suitable source. Thus residual liquor from an alkaline cooking operation with a cooking liquor which contains a sulfur-bearing compound of sodium, such as a cooking liquor which comprises sodium hydroxide and sodium sulfite or/and sodium sulfid, may be evaporated to remove water and leave a residue which is thereafter furnaced to decompose organic matter and to reduce any oxy-sulfur sodium compound or compounds to form a furnace product similar to that described above. The furnace product so obtained may be used to prepare the solution containing sodium carbonate and sodium sulfid which is thereafter treated with the sulfite radicle, e. g. as ammonium sulfite, in the manner disclosed above.

In a similar manner, wood, etc., may be cooked with cooking liquor which comprises a carbonate of sodium or/and sodium thiosulfate together with a larger amount of sodium sulfite to form pulp or pulpy material and yield a residual liquor which is thereafter evaporated and the residue furnaced under reducing conditions to form a furnace product from which a solution containing sodium carbonate and sodium sulfid may be obtained.

Alternately, the wood, etc., may be cooked with liquor which comprises sodium sulfite and sodium sulfid to form pulp or pulpy material and residual liquor, and the residual liquor may be evaporated and the residue furnaced under reducing conditions to form the furnace product, and the latter may be treated with water to form the solution containing sodium carbonate and sodium sulfid. In any such case the solution obtained from the furnace product may be treated with the sulfite radicle, e. g. with an ammonium sulfite solution as pointed out above.

In order to replace losses of soda in the operations, a sulfate of sodium may be added to the cycle at any suitable point, e. g., it may be added to residual liquor either before or after concentration thereof, and it is preferably added to the cycle prior to furnacing the residue left after evaporation of the residual liquor, and sodium sulfid derived therefrom by the reducing furnace treatment, thus supplying both soda and sulfid-sulfur to the cycle. In a later furnacing, some of the soda thus added is usually converted into sodium carbonate and appears as such in a furnace product.

Such method of operation enables a portion of the pulp output of a mill to be produced by a sodium hydroxide type of cooking operation and another portion to be produced by a sulfite of sodium type of cooking operation, and the ratio of the amount produced by one type to the amount produced by another type may be regulated as desired by varying the amount of the sodium carbonate and sodium sulfid liquor which is causticized and the amount of such liquor which is treated so as to produce a sulfite of sodium, as by a method herein outlined, for example. And soda losses may be replaced by a sulfate of sodium, thereby gaining not only soda but also some sulfur, sulfur of a sulfate of sodium being reduced to sulfid-sulfur and thereafter converted, at least in part, into sulfite-sulfur and employed as a sulfite in cooking liquor. In a companion application we are disclosing a process for such a multiple-liquor mill operation and such process is being claimed in such application.

The furnace product which contains the sodium carbonate and the sodium sulfid may be produced in any suitable manner, it being advantageous to have a reducing condition in the presence of incandescent carbon in the furnacing operation so as to obtain a relatively large amount of sodium sulfid in the furnace product. By using sodium sulfate or sodium acid sulfate to replace soda losses by adding such sulfate to other sodium-bearing material and later carrying out the furnacing treatment under reducing conditions, a relatively large amount of sodium sulfid can be obtained. When such sodium sulfid, or a chosen portion thereof, is treated to remove sulfid-sulfur as a volatile sulfid and the latter is burned to form sulfur dioxide and this is employed in producing a sulfite of sodium, use is made of both the soda content and the sulfur content of the sulfate of sodium in an advantageous manner.

The reducing furnacing operation may be carried out in a rotary incinerating furnace such as is ordinarily used for treatment of concentrated black liquor from the digesting operation of the conventional soda process. Or the furnacing treatment may be carried out by first removing water from residual liquor and forming a dry product by means of a rotary furnace such as is used in the conventional method of treating concentrated black liquor from the conventional sulfate process, and then treating the solids (including a sufficient amount of carbonaceous material) in a furnace of a smelting type to produce a sodium carbonate-sodium sulfid melt. The melt may be dissolved in water, preferably while still hot from the furnace and either after or without a regulated oxidation treatment which is adapted by means of heated air, to convert a regulated amount of sodium sulfid into sodium sulfite. The residual liquor from the digesting operation may, instead of the above, be given a preliminary evaporation treatment to produce a hot concentrated residual liquor; and this hot concentrated liquor may then be sprayed into hot gases from the burning furnace to produce a dried and finely divided material, this dried material is then burned in a burning furnace, e. g. as powdered fuel, under conditions regulated to decompose or burn organic matter and produce highly heated gaseous products of combustion and to form a furnace product containing sodium carbonate and sodium sulfid. Some carbonaceous material may, if needed or desired, be charged into the burning furnace in such manner that it is present with the melting or/and molten material in the lower portion of the burning furnace, so as to aid in obtaining and maintaining a relatively large amount of sodium sulfid in the melt which runs out from the furnace.

The highly heated products of combustion from the burning furnace may be used for generating steam by passing them through a suitable boiler. If desired hot concentrated residual liquor or solids may be sprayed or blown into such a suitable burning furnace placed before the boiler, as pointed out in our former applications Serial No. 513,161 filed November 5, 1921 and Serial No. 248,969 filed January 23, 1928.

The furnace gases may be scrubbed, for example after having been passed through such a steam-boiler, and oxy-sulfur material regained therefrom. For this purpose, such gases may be scrubbed either by means of residual liquor or/ and by means of a solution which contains either sodium carbonate or sodium sulfite or both sodium carbonate and sodium sulfite. Such latter solution or solutions may be derived from the furnace product as by using the liquor remaining after removal of sulfid-sulfur, such as pointed out above. By scrubbing such furnace gases which carry oxy-sulfur material, such as sulfur dioxide, etc., the scrubbing liquor may thus regain sulfur which has been driven off from residual liquor or from a residue during the furnacing treatment of sodium-sulfur material derived from residual liquor. Thus the hot gases coming from the steam-boiler may be scrubbed with residual liquor, thereby effecting an evaporation of water and in some cases regaining some soda and/or some oxy-sulfur material e. g. sulfur trioxide carried by the gases; and some sulfur dioxide may be transferred from the residual liquor to the gases, especially if the residual liquor be converted into finely divided dry material by spray evaporation, and provided it contained considerable sulfite. The relatively cool gases which result may then be subjected to a scrubbing treatment by means of liquor containing sodium sulfite or sodium carbonate or both sodium sulfite and sodium carbonate, and such scrubbing treatment may regain some sulfur dioxide from the gases, the amount depending upon the sulfur dioxide content of the gases and upon the conditions maintained during the scrubbing treatment.

It is advantageous to regulate the scrubbing treatments so that most if not all of the soda and sulfur trioxide carried by the gases coming from the steam-boiler are recovered by the residual liquor or the concentrated product which may be derived therefrom by such scrubbing and evaporation treatment therewith, and to transfer as much as feasible of the sulfur dioxide content of the residual liquor to the gases, and then to regain such released sulfur dioxide as well as such sulfur dioxide as may be present in the furnace gases as they come from the steam-boiler, in the sodium sulfite or/and sodium carbonate liquor referred to above. Such sulfur trioxide as is removed from the gases by means of residual liquor or resulting powdered material if any is delivered into the furnace along with the other material and can thus undergo a reducing treatment to form sodium sulfid, while the sulfur dioxide regained from the gases in the other type of liquor is available for cooking liquor or other purposes described herein. The latter type of liquor, after being used as a scrubbing liquor, may be suitably modified, if needed or desired, and then used for cooking wood, etc., whether it be alkaline, neutral or acid to litmus, depending upon the degree to which the liquor was sulfited during or subsequent to the scrubbing treatment. Such liquor can also be used for other purposes, such as, for example, for reacting by virtue of dissolved sodium bisulfite, with a liquor which contains some free ammonia so as to provide a solution (alkaline to litmus) which contains both sodium sulfite and ammonium sulfite and may still contain some free ammonia. This solution may then be used to treat some sodium carbonate-sodium sulfid solution obtained from a furnace product of the cycle.

Where volatile gases, driven off from the soda solution, carry both hydrogen sulfide and ammonia, with the ammonia in much larger amount than the chemical equivalent of the hydrogen sulfide, burning of the hydrogen sulfide will yield gases which carry ammonia in excess of that necessary to combine with the sulfur dioxide thus formed. The method outlined above provides for making good use of some of the excess ammonia. When such ammonia and sulfur dioxide are absorbed in cool water, the solution may contain some ammonium carbonate in addition to ammonium sulfite, some carbon dioxide having been released from sodium carbonate and removed from the solution along with the ammonia and hydrogen sulfide. Sodium bisulfite can react with some of the ammonium carbonate to form ammonium sulfite and drive out some of the carbon dioxide. If desired, such solution may still contain some ammonium carbonate when it is added to the sodium carbonate-sodium sulfide solution. Upon heating of the resulting admixture of solutions, carbon dioxide as well as hydrogen sufide and ammonia will be driven off as volatile materials.

Before adding ammonium sulfite solution to the sodium carbonate-sodium sulfid solution it may, if desired, be treated with a small amount of lime so as to convert some, or substantially all, of the ammonium carbonate into free ammonia and remove the carbon dioxide radicle from the solution in the form of calcium carbonate; but care should be exercised to avoid adding too much lime over that chemically equivalent to the carbon dioxide content of the solution as this may remove too much sulfite radicle from the liquor as calcium sulfite ($CaSO_3$). The amounts and proportions of sodium sulfite and ammonium sulfite, with or without ammonia, etc., may vary considerably; thus either ammonium sulfite or sodium sulfite may be present in preponderating amount in the resulting solution.

Another advantageous method which may be employed for treating sodium carbonate-sodium sulfid liquor derived from the furnace product by treating it with water, comprises using some alkaline earth sulfite, e.g., magnesium sulfite ($MgSO_3$), either alone or together with ammonium sulfite, for producing sodium sulfite. When the process is thus carried out with magnesium sulfite, the chemical action is similar to that which takes place in the case of ammonium sulfite, in that the magnesium sulfite formed in the solution is decomposed to give a volatile sulfide and a basic compound of magnesium. The former is driven off by boiling while the latter is precipitated. However, the presence of the base, even though it is in part a precipitate, helps to keep the solution alkaline and thereby to prevent the formation of sodium thiosulfate.

Ammonium sulfite and magnesium sulfite, and/or calcium sulfite ($CaSO_3$), with some free ammonia, if needed or desired, may be used to treat the hot concentrated sodium carbonate-sodium sulfid solution, and the solution may advantageously be heated to boiling prior to introducing the sulfite radicle and maintained at or near the boiling point during the entire time occupied in introducing the sulfite radicle or until the sulfide-sulfur is substantially all removed from the solution. For example, the sulfite radicle may be introduced into the hot soda solution at a slow rate and hydrogen sulfid may be removed from the liquor substantially as fast as it is formed. A volatile sulfid, together with some ammonia, if ammonium sulfite or free ammonia has been used, will be driven out from the liquor. These may be conducted to the combustion chamber and the sulfid-sulfur burned to sulfite.

The ratio of ammonium sulfite to magnesium sulfite and/or calcium sulfite may vary considerably, but it is an advantage to employ no more calcium sulfite than is equivalent to the sodium carbonate, and to depend on either ammonium sulfite or magnesium sulfite or a mixture thereof to convert sodium sulfid into sodium sulfite and drive out hydrogen sulfid. The amount of ammonium sulfite used may be less than or equal to or larger than that amount which is chemically equivalent to the sodium sulfid. When magnesium sulfite is used for sulfiting the sodium carbonate, it may be converted into a carbonate of magnesium, forming a precipitate, and sodium sulfite will be produced. The amount of magnesium sulfite which may be employed, either alone or in conjunction with another sulfite such as ammonium sulfite, for example, may be such as will insure that substantially all of the sodium carbonate and sodium sulfid will be acted upon by the sulfite radicle; or any desired lesser amount may be thus used, and substantially all of the magnesium sulfite may be thus converted into a precipitated compound or compounds of magnesium. An excess of magnesium sulfite, etc., over that needed to remove all of the carbon dioxide radicle away from the sodium carbonate, may or may not be used. If an excess of magnesium sulfite be used, it will appear to some extent in the solution. During the formation and removal of volatile sulfid, the solution advantageously is maintained distinctly alkaline to phenolphthalein substantially throughout, is kept concentrated and at or around the boiling point, and is agitated, thus keeping the amount of hydrogen sulfid in the liquor at any instant down to its substantial minimum.

It is an advantage of the use of magnesium sulfite that the precipitate which is formed assists materially in clarifying the solution. This effect is particularly advantageous when the precipitate consists at least in part of magnesium hydroxide.

After the sulfid-sulfur has been eliminated from the liquor to the desired degree, or at any suitable time prior thereto, the precipitated material (comprising carbonate of magnesium or/and calcium carbonate) is separated from the liquor and may be again used to form more alkaline-earth metal sulfite or sulfites. Such sulfite or sulfites may be reused in a similar manner. In order to convert the precipitate into a sulfite or sulfites, as the case may be, a solution of sodium acid sulfite containing the required amount of available sulfur dioxide may be admixed with the precipitate and agitated therewith until substantially all of the sodium is present as normal sodium sulfite and all or nearly all of the alkaline-earth metal compound or compounds have been converted into normal sulfite or sulfites. The slurry may be heated, if desired, prior to adding it to a solution of sodium carbonate and sodium sulfid, in order to remove any dissolved or loosely combined carbon dioxide.

In some cases, the amount of alkaline earth metal sulfite employed may be such that an amount of ammonium sulfite equal to or less than that chemically equivalent to the sodium sulfid may be employed, or ammonium sulfite may be entirely dispensed with and the sulfiting be effected by magnesium sulfite alone, in which instances some of the magnesium may be converted into a sulfid of magnesium which compound will be decomposed at the boiling temperature of the liquor, forming magnesium hydroxide and volatile sulfid being removed from the liquor.

Some free ammonia may, if desired or needed, be maintained in the liquor until substantially all of the volatile sulfid has been removed from the liquor, thus aiding in the prevention of thiosulfate formation.

Various mixtures of magnesium sulfite and ammonium sulfite, either with or without calcium sulfite, and either with or without free ammonia, may be employed for the treatment of the sodium carbonate-sodium sulfid solution. In some cases, most if not all of the sulfiting of the sodium compounds can be effected by magnesium sulfite, either alone or in conjunction with calcium sulfite, and little or none effected by ammonium sulfite, care being taken to maintain the solution sufficiently alkaline to phenolphthalein, e. g. with a suitable hydroxyl compound or compounds, until the desired amount of sulfid-sulfur has been removed as a volatile sulfid, using care to maintain the liquor at or near the boiling point while it contains any appreciable amount of volatile sulfid. When little or no ammonium sulfite is employed, magnesium sulfite may be used in an amount which is just about chemically equivalent to the sodium sulfid; but there is an advantage in using somewhat more magnesium sulfite than this, e. g. an amount ranging up to that which is chemically equivalent to both the sodium carbonate and sodium sulfid, although an excess can be used if this is desired.

Calcium sulfite can be used to sulfite any portion or substantially all of the sodium carbonate and after this has been done magnesium sulfite can be used to react with sodium sulfid and remaining sodium carbonate, if any. The precipitate in such cases comprises a carbonate of magnesium or/and magnesium hydroxide, the latter apparently resulting from decomposition of magnesium sulfid with liberation of hydrogen sulfide and formation of the relatively insoluble magnesium hydroxide.

In case magnesium hydroxide is not present in sufficient amount or hydroxyl is not otherwise present in adequate concentration to prevent formation of thiosulfate in prohibitive or undesired amount, good results may be obtained by retaining in the solution enough free ammonia to maintain it basic. A relatively small amount of ammonia may be thus used, most or all of the sulfiting being carried out by means of magnesium sulfite either alone or subsequent to treatment of sodium carbonate with calcium sulfite. The liquor should be kept hot and sufficiently alkaline to phenolphthalein; and carbon dioxide or/and hydrogen sulfid should not be permitted to build up in the solution to an objectionable or a prohibitive point.

A solution comprising sodium sulfite and sodium sulfid, such as results from treatment of a sodium carbonate-sodium sulfid liquor by means of calcium sulfite, for example, in amount just about equivalent to the sodium carbonate, may be treated with a mixture of calcium sulfite and magnesium sulfite, the latter in amount substantially equivalent to or a little more than is equivalent to the sodium sulfid; and volatile sulfid then driven off from the heated liquor. The precipitate may then be separated from the liquor and the calcium sulfite contained therein may be used to react with sodium carbonate in a liquor which also contains sodium sulfid, and the resulting liquor may be separated from the solids and then treated by a mixture of calcium sulfite and magnesium sulfite. The mixture of calcium carbonate and the basic magnesium precipitate may be sulfited, as pointed out above, by means of sodium acid sulfite for example, and such formed calcium sulfite and magnesium sulfite employed in the foregoing manner. Dolomitic material may be thus employed in the process.

A flow sheet illustrative of the process of the invention is shown in the accompanying drawing, with the various operations and apparatus illustrated in a conventional manner and with the successive steps and sequence of operations, supply of materials and removal or recirculation of materials, indicated by arrows, in a conventional manner.

From the foregoing it will be clear, that an oxysulfur compound of sodium (such for example as sodium sulfate, sodium bisulfate, sodium sulfite, sodium bisulfite, sodium thiosulfate, sulfo-organic compounds of sodium, etc., or mixtures of two or more thereof) may be subjected to a reducing treatment in the presence of incandescent carbon, thereby forming a furnace product including sodium sulfid; that sodium content of sodium sulfid thereof may be converted into an oxysulfur compound of sodium and sulfur content thereof may be removed from the latter oxysulfur compound of sodium as a sulfid; and that the latter oxysulfur compound of sodium may be subjected to a treatment including a reducing treatment adapted to form sodium sulfid. As an illustration, sodium sulfite or/and sodium sulfate may be admixed with carbonaceous material and furnaced under highly reducing conditions to form a furnace product containing a large portion of its sodium content in the form of sodium sulfid. Such sodium sulfid may be dissolved in water to form a solution and this solution may be treated with a suitable oxysulfur compound of magnesium (e. g., $MgSO_3$ or/and $MgSO_4$) in amount sufficient to convert substantially all of the sodium content of the sodium sulfid into the corresponding sodium compound (e. g., sodium sulfite or/and sodium sulfate), and the solution may be boiled to drive out substantially all of the released hydrogen sulfid, thereby forming a precipitated material including a compound of magnesium. The precipitated material can be washed and dried and sold, or it can, in whole or in part, be used to react with $SO_2$ carried by the gases to form magnesium sulfite or/and with $SO_3$ to form magnesium sulfate. The process may be repeated two or more times.

We claim:

1. The method of treating residual liquor from the cooking of wood with a solution including a sulfite of sodium, which comprises furnacing constituents of the residual liquor under conditions adapted to provide sodium carbonate and sodium sulfid, dissolving such sodium compounds, adding ammonium sulfite to the resulting solution, and boiling the solution to remove ammonium carbonate and ammonium sulfid therefrom.

2. The cyclic process for producing sodium sulfite from sodium sulfid, which comprises adding ammonium sulfite to a solution of the sodium sulfid, boiling the solution to remove ammonia and a sulfid, leaving sodium sulfite in solution, burning sulfur so removed, thereby forming a mixture of sulfur dioxide and ammonia, absorbing said material to form a solution of ammonium sulfite, and utilizing such ammonium sulfite for treating sodium sulfid.

3. The method of producing a solution containing sodium sulfite from a solution containing sodium sulfid which comprises treating such solution with a sulfite selected from the group consisting of calcium, magnesium and ammonium sulfites to react with the sodium sulfid to form sodium sulfite and a readily removable sulfid, and removing such sulfid from the solution.

4. The method of producing a solution containing sodium sulfite from a solution containing sodium sulfid which comprises treating such solution with a sulfite of ammonium with resulting production of sodium sulfite in solution and a volatile sulfid, and removing such volatile sulfid from the solution.

5. The method of producing a solution containing sodium sulfite from a solution containing sodium sulfid which comprises treating such solution with an alkaline earth metal sulfite selected from the group composed of calcium sulfite and magnesium at a temperature which will drive off hydrogen sulfid and precipitate an insoluble alkaline earth metal compound.

6. The method of producing a solution containing sodium sulfite from a solution containing sodium sulfid which comprises adding to such solution a sulfite selected from the group consisting of calcium, magnesium, and ammonium sulfites to react with the sodium sulfid to form sodium sulfite and a volatile sulfid, and removing the volatile sulfid from the solution.

7. The method of producing a solution containing sodium sulfite from a solution containing sodium sulfid which comprises adding to the solution while it is maintained substantially non-acid in character a sulfite selected from the group consisting of calcium, magnesium, and ammonium sulfites to react with the sodium sulfid to form sodium sulfite and a volatile sulfid, and removing the volatile sulfid from the solution.

8. The method of producing a solution containing sodium sulfite from a solution containing sodium sulfid which comprises treating such solution while maintained under substantially non-acid conditions with a sulfite selected from the group consisting of calcium, magnesium, and ammonium sulfites and maintaining the solution at a temperature sufficient to remove hydrogen sulfid from the solution.

9. The method of producing a solution containing sodium sulfite from a solution containing sodium sulfid and sodium carbonate which comprises treating such solution with a sulfite of ammonium at a temperature which will drive off a volatile sulfid from the solution and leave a solution containing sodium sulfite.

10. The method of producing a solution containing sodium sulfite from a solution containing sodium sulfid and sodium carbonate which comprises treating such solution with a sulfite selected from the group consisting of calcium, magnesium and ammonium sulfites to convert the sodium carbonate and sodium sulfid into sodium sulfite and form a volatile sulfid, and maintaining the solution at a temperature sufficient to remove the volatile sulfid from the solution.

11. The method of producing a solution containing sodium sulfite which comprises treating a hot solution containing sodium carbonate and sodium sulfid with ammonium sulfite, the temperature being maintained sufficiently high to drive off the sulfid sulfur as a volatile sulfid.

12. The method of producing a solution containing sodium sulfite from a solution containing sodium carbonate and sodium sulfid which comprises treating such solution while maintained at a temperature around the boiling point with ammonium sulfite and excess ammonia and agitating such solution to promote the removal of the sulfid sulfur as a volatile sulfid.

13. The method of producing a solution containing sodium sulfite from a solution containing sodium carbonate and sodium sulfid which comprises adding to a hot concentrated solution containing sodium carbonate and sodium sulfid ammonium sulfite with excess ammonia in amount sufficient to react with the sodium sulfid to form sodium sulfite and a volatile sulfid, and promoting the removal of the volatile sulfid by boiling and agitation of the solution.

14. The method of producing a regenerated cooking liquor containing a sulfite of sodium from a furnace product containing sodium carbonate and sodium sulfid which comprises treating a solution of the sodium carbonate and sodium sulfid with a sulfite selected from the group consisting of calcium, magnesium and ammonium sulfites to react with the sodium sulfid to form sodium sulfite and a volatile sulfid, maintaining the solution substantially non-acid and at a temperature which will promote the removal of the volatile sulfid and subsequently subjecting the resulting solution containing sodium sulfite and sodium carbonate to sulfiting with sulfur dioxide to convert the sodium carbonate into sodium sulfite.

15. The method of producing a solution containing sodium sulfite from a solution containing sodium sulfid which comprises treating such solution with ammonium sulfite under conditions to form sodium sulfite and a volatile sulfid, removing the volatile sulfid together with ammonia from the solution, oxidizing the volatile sulfid to form sulfur dioxide in admixture with ammonia, absorbing the resulting gases in water to form a solution of ammonium sulfite and using such solution for the treatment of further amounts of solutions containing sodium sulfid.

16. The method of producing a solution containing sodium sulfite from a solution containing sodium sulfid which comprises treating such solution with ammonium sulfite and an alkaline earth metal sulfite selected from the group composed of calcium sulfite and magnesium sulfite at a temperature sufficiently high to form and remove the sulfid sulfur as a volatile sulfid and form a solution containing sodium sulfite and an insoluble alkaline earth metal compound as a precipitate.

17. The method of forming a solution containing sodium sulfite from a solution containing sodium carbonate and sodium sulfid which comprises treating such solution with ammonium sulfite and an alkaline earth metal sulfite selected from the group composed of calcium sulfite and magnesium sulfite at a sufficiently high temperature to drive off sulfid sulfur in the form of a volatile sulfid and to form an alkaline earth metal carbonate, and removing the volatile sulfid and the alkaline earth metal carbonate from the sodium sulfite solution.

18. The method of treating residual liquor from the cooking of wood with a solution including a sulfite of sodium which comprises furnacing constituents of the residual liquor under conditions adapted to provide sodium carbonate and sodium sulfid, dissolving such sodium compounds, adding to the resulting solution while maintained under substantially non-acid conditions a sulfite selected from the group consisting of calcium, magnesium and ammonium sulfites, maintaining the solution at a sufficiently high temperature to remove a volatile sulfid from the solution, and converting the sodium carbonate into a sulfite of sodium by means of available sulfur dioxide.

19. The method of treating solutions that contain sodium sulfid, which comprises admixing therewith an oxysulfur compound selected from the group composed of ammonium, calcium and magnesium sulfites and magnesium sulfate, and heating the liquor to remove a volatile sulfid therefrom.

LINN BRADLEY.
EDWARD P. McKEEFE.